(12) United States Patent
Kuribayashi et al.

(10) Patent No.: US 7,230,399 B2
(45) Date of Patent: Jun. 12, 2007

(54) VEHICULAR GENERATOR-MOTOR SYSTEM

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 10 days.

(21) Appl. No.: 10/705,955

(22) Filed: Nov. 13, 2003

(65) Prior Publication Data

US 2004/0130283 A1    Jul. 8, 2004

(30) Foreign Application Priority Data

Nov. 29, 2002   (JP)   ............ P2002-348257

(51) Int. Cl.
*H02K 17/32*   (2006.01)
*H02K 23/68*   (2006.01)
*H02P 7/00*   (2006.01)

(52) U.S. Cl. .............. 318/434; 318/432; 318/430; 318/140; 318/147; 318/151; 318/152; 290/40; 322/20; 322/27

(58) Field of Classification Search ........ 318/430–434, 318/700–800, 140–154, 521–537; 290/25–48; 322/27

See application file for complete search history.

(56) References Cited

U.S. PATENT DOCUMENTS

| | | | | |
|---|---|---|---|---|
| 4,079,301 A | * | 3/1978 | Johnson, III ................ | 388/803 |
| 4,110,669 A | * | 8/1978 | Akamatsu ................... | 318/700 |
| 4,284,932 A | * | 8/1981 | Kawada et al. ............. | 388/804 |
| 4,629,968 A | | 12/1986 | Butts et al. | |
| 4,803,376 A | * | 2/1989 | N'Guyen ..................... | 290/22 |
| 4,845,413 A | * | 7/1989 | Hackl et al. ................ | 388/805 |
| 5,014,336 A | * | 5/1991 | Grassl et al. ............... | 388/843 |
| 5,969,303 A | * | 10/1999 | Piserchia et al. ........... | 187/297 |
| 5,973,482 A | | 10/1999 | Meinert | |
| 6,118,247 A | * | 9/2000 | Obayashi et al. ........... | 318/712 |
| 6,614,142 B1 | * | 9/2003 | Bonnieman et al. ........ | 310/216 |
| 6,713,882 B2 | | 3/2004 | Yasuda | |
| 6,713,888 B2 | * | 3/2004 | Kajiura ..................... | 290/40 F |
| 6,806,670 B2 | * | 10/2004 | Kusaka ....................... | 318/437 |
| 6,888,329 B2 | * | 5/2005 | Inoue et al. ................ | 318/254 |
| 2002/0074803 A1 | | 6/2002 | Kajiura | |

FOREIGN PATENT DOCUMENTS

| | | |
|---|---|---|
| CN | 2277142 Y | 3/1998 |
| CN | 1184041 A | 6/1998 |

(Continued)

OTHER PUBLICATIONS

European Search Report.

*Primary Examiner*—Lincoln Donovan
*Assistant Examiner*—Tyrone Smith
(74) *Attorney, Agent, or Firm*—Sughrue Mion, PLLC

(57) ABSTRACT

A vehicular generator-motor 1 is composed of a rotor, a stator having three phase armature winding 2, and a converter 4. The rotor is provided with a field winding 3 for magnetizing a plurality of magnetic pole pieces 14a, 15a, and permanent magnets 17 for magnetizing the magnetic pole pieces 14a, 15a together with the field winding 3. When the generator-motor 1 is operated as a motor, the converter 4 is operated as an inverter to restrain the armature current at the time of low speed rotation to the extent of the additional magnetic flux from the permanent magnets.

11 Claims, 5 Drawing Sheets

FOREIGN PATENT DOCUMENTS

| | | | |
|---|---|---|---|
| JP | 07-001975 A | | 1/1995 |
| JP | 09-297076 A | | 11/1997 |
| JP | 11-136913 | * | 5/1999 |
| JP | 11-313498 | | 11/1999 |
| JP | 2001-016900 A | | 1/2001 |
| JP | 2002-191158 A | | 7/2002 |

* cited by examiner

VEHICULAR GENERATOR-MOTOR SYSTEM

BACKGROUND OF THE INVENTION

1. Field of the Invention

The present invention relates to a vehicular generator-motor system mounted on an internal combustion engine in a vehicle. In particular, the present invention relates to the vehicular generator-motor system that performs for both starting the internal combustion engine and charging a battery mounted in the vehicle.

2. Description of the Related Art

For simplification of equipment or devices mounted in the vehicle, recently, a synchronous rotary machine which operates both as a generator for charging the battery and as a motor for starting the internal combustion engine has been utilized and a various types of systems have been developed heretofore. Among those, there is an approach of using magnetic fields consisting of field windings and permanent magnets to restrain a leakage flux from a claw-shaped magnetic pole, thereby increasing an output power.

The Japanese patent publication No. JP-A-11-136913 discloses a rotor of claw-shaped pole type comprising a rotor coil (field winding) generating magnetic flux, and a pair of pole cores forming so as to surround the rotor coil and having a plurality of claw-shaped pole pieces alternately meshed to each other. The publication also proposes that permanent magnets disposed between the claw-shaped pole pieces alternately meshed are magnetized to the same polarity with that of the magnetic pole to which it attaches, thereby restraining the leakage flux produced between the magnetic pole pieces and thus increasing the output power.

In order to increase the generated output power, there is the other approach in which the permanent magnets are disposed in parallel with the direction of a magnetomotive force produced by the field winding. This approach provides an additional flux to the armature and avoids magnetic saturation in the magnetic path formed in the inner diameter of the field winding. Furthermore, in order to increase the generated output at the time of low speed rotation, there is a technique in which a current flowing through the armature winding is phase-controlled by the inverter to permit a torque current to become negative.

Comparing the synchronous rotary machine used both as the starting motor for the internal combustion engine and as the charging generator for the battery with the synchronous rotary machine used for the generator only, the following problems will arise. Namely, for the purpose of improving a responsibility as the starting motor for the internal combustion engine, it is needed to reduce the number of turn of the field winding, i.e. inductance, to make the time constant small. As the result, when the machine is operated as a generator, it frequently happens that the generated output becomes in shortage and the battery becomes to the overcharging state especially at the time of low speed rotation.

As a measure against above problem, it may be considerable that the current flowing through the armature winding is phase-controlled by the inverter so as to become. This technique, however, is not necessarily excellent in generated efficiencies. Further, when the synchronous rotary machine is operated as a starting motor, a large current is likely to flow through the inverter at the starting stage, thereby the switching elements in the inverter are upsized, and are forced to be equipped with a water cooling system. Likewise, the increase in charging and discharging current results in shortage in the battery life.

In case where the synchronous rotary machine having the field windings and the permanent magnets is used both as a generator and as a motor, the property as to the generator is improved by a function of the additional magnetic flux from the permanent magnets, thereby avoiding the shortage in the generated output.

On the other hand, when the machine is operated as the starting motor for the internal combustion engine, the maximum torque at the starting stage increases, but the induced voltage in the armature increases with increasing rotating speed by the magnetic flux from the permanent magnets. As the result, there is a problem that the motor property at the time of high speed rotation extremely deteriorates because of restraining the armature current.

SUMMARY OF THE INVENTION

In view of the foregoing, an object of the present invention is to overcome problems mentioned in the conventional structures.

An another object of the present invention is to provide a vehicular generator-motor system that is superior to the conventional approaches in both the generator property and motor property.

A further object of the present invention is to provide a vehicular generator-motor system that enables the inverter and other peripheral equipment to be downsized.

A vehicular generator-motor system according to the present invention comprises a rotary machine including a stator having three phase armature winding and a rotor composed of a field winding for magnetizing a plurality of field magnetic poles and permanent magnets for magnetizing said field magnetic poles by interaction with the field winding, an electrical power converter which performs as a rectifier when said machine is operated as a generator, and performs as an inverter when said machine is operated as a motor, and a control means for controlling the converter, thereby, when the machine is operated as a motor, said control means controls the converter so as to restrict the armature current at the time of low speed rotation.

BRIEF DESCRIPTION OF THE DRAWINGS

The above objects and advantages of the present invention will become apparent from the following detailed description of the preferred embodiments when read in connection with the accompanying drawings, which are given by way of illustration only, wherein like reference numerals designate like or corresponding parts throughout the several views.

DETAILED DESCRIPTION OF THE PREFERRED EMBODIMENTS

Embodiment 1

Figure 1:
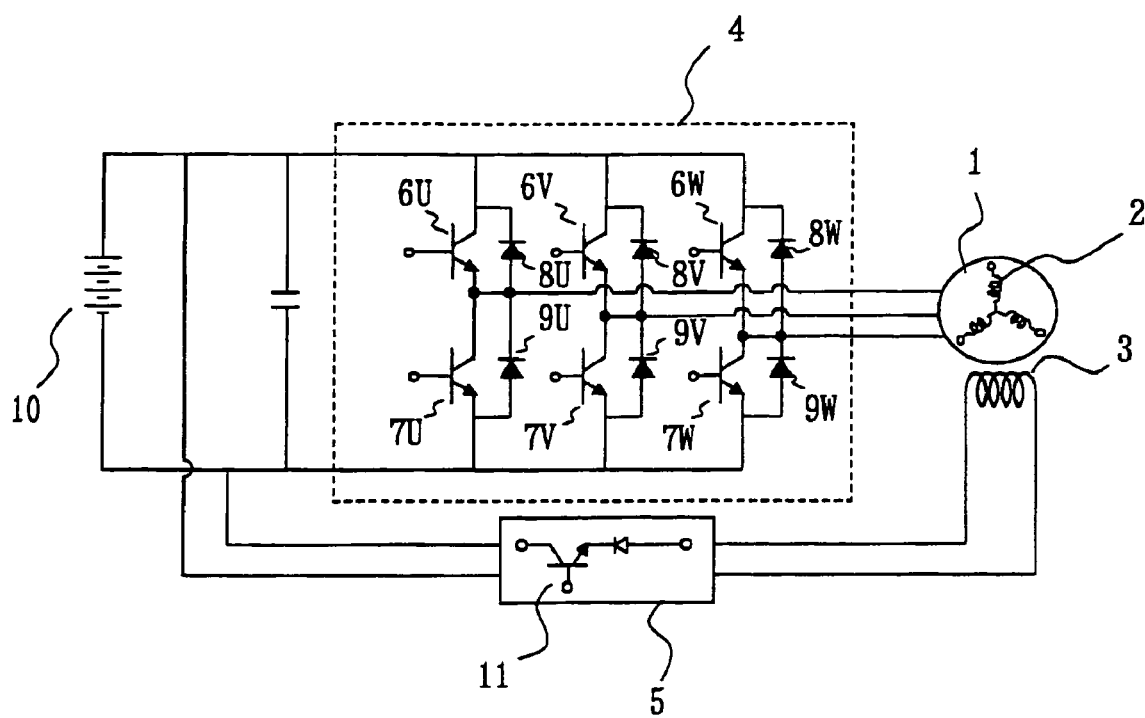
FIG. 1 is a configuration view of a vehicular generator-motor system according to a first preferred embodiment of the invention.

FIGS. 1 to 6 are for explaining vehicular generator-motor system according to the first preferred embodiment of the invention. In FIG. 1, the generator-motor 1 is a synchronous rotary machine composed of three phase armature windings 2, a field winding 3, and permanent magnets for serving additional magnetic flux. The generator-motor 1 is mounted on the internal combustion engine and is operated as a starting motor at the starting stage of the internal combustion engine and as a charging generator after starting of the engine. The instruction from the control means not shown is given to a converter 4 and a field current control means 5, and by controlling the both, the generator-motor 1 is operated as the starting motor or the charging generator. The converter 4 is three phase full wave bridge circuit composed of switching elements 6u to 6w, 7u to 7w and diodes 8u to 8w, 9u to 9w. The switching elements 6u to 6w, 7u to 7w are controlled respectively with PWM (Pulse Width Modulation) by control signals from the control means to supply three phase AC current to the armature winding 2 of the generator-motor 1 and to operate the generator-motor 1 as a motor. On the other hand, when the generator-motor 1 is operated as a generator, the output of the generator-motor 1 is full-wave rectified by the diodes 8u to 8w, 9u to 9w to charge the battery mounted on the vehicle. The field current control means 5 is served a power from the battery 10 to supply the field current to the field winding 3. When the generator-motor 1 is operated as a generator, the switching elements 11 are turned on and off in response to the output voltage to control the field current at the given duty ratio.

Consequently, the output of the generator-motor 1 is controlled to the targeted value according to the state of discharge of the battery 10. When the generator-motor 1 is operated as a motor, on the other hand, the control means controls the field current to the targeted current value in response to the rotating speed or the armature current, etc., as explained later.

Figure 2:
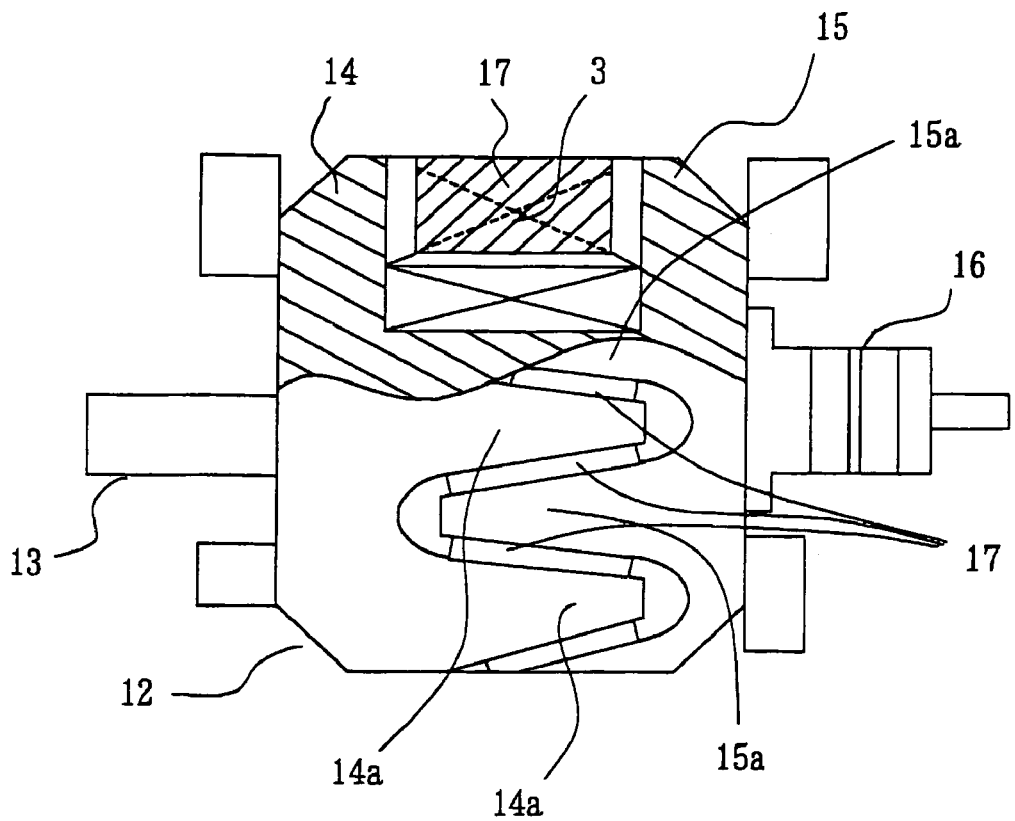
FIG. 2 is a partial sectional view of a rotor used for the vehicular generator-motor system according to the first preferred embodiment of this invention.

FIG. 2 shows a schematic constitution of the rotor 12 of the generator-motor 1. A rotor 12 is composed of a shaft 13, claw-shaped pole type rotor cores 14, 15 secured on the shaft 13 and magnetized by the field current flowing through the field winding 3, and slip rings 16 for supplying the field current to the field winding 3. Each of the rotor cores 14, 15 has a plurality of claw-shaped magnetic pole pieces 14a, 15a which are disposed so as to be alternatively meshed and magnetized so as to be of alternatively different polarity. The permanent magnets 17 are inserted between each of adjacent claw-shaped pole pieces 14a and 15a, and are magnetized to the same polarity of that of the each claw-shaped pole to which it opposes.

In the conventional technique, between each adjacent pieces 14a and 15a of the claw-shaped poles, a leakage magnetic flux is generated in accordance with an area of the plain which the poles face each other and a distance between the poles. Thus, a field magnetic flux inter-linked with the armature winding 2 is reduced by the extent of the leakage magnetic flux. However, by disposing the permanent magnets as mentioned above, the leakage flux between each claw-shaped poles is effectively restrained and the magnetic flux from the permanent magnets 17 is inter-linked with the armature winding 2 together with the flux from the field winding 3. This phenomenon occurs in all pieces of claw-shaped d poles, the magnetic flux inter-linked with the armature winding 2 increases significantly.

In the case where the vehicular generator-motor 1 is operated as a motor in this preferred embodiment, the generator-motor 1 will be controlled as follows. The generator-motor 1 is usually served the field current and the armature current required for obtaining the starting torque. In this embodiment, however, the armature current required for obtaining the starting torque can be set to a smaller value than the conventional one by the extent of the field magnetic flux increased by the permanent magnets. It is because that the generated torque in the motor is proportional to the product of the armature current and the field current. The converter 4 comprises switching elements 6u to 6w, 7u to 7w and makes up the inverter for serving the armature current to the armature of the generator-motor 1. The armature current supplied at the starting stage of the internal combustion engine is to determine the output capacity of the inverter and each capacity of switching elements 6u to 6w, 7u to 7w, as well as the cooling system thereof. But, as described above, the increase in the magnetic flux inter-linked with the armature winding 2 permits the system to control so as to reduce the armature current, thereby enabling to reduce each capacity of switching elements 6u to 6w, 7u to 7w and simplifying the cooling system therefor. (e.g. air-cooling instead of water-cooling.) It also reduces power loss of the system and the necessity of resetting electronic equipment can be eliminated under the circumstance in which the battery voltage is abnormally reduced by a large current flowing. In control devices or audio/visual equipment mounted on the 12 V system vehicle, for example, those are constituted so as to be reset due to the reduction of the power voltage below 6 to 8 V, and in fact, those are reset every time the internal combustion engine starts. According to this preferred embodiment, it is possible to reduce the armature current of the generator-motor 1 at the starting stage of the internal combustion engine, and the battery voltage is restrained from reducing, thereby, resetting of such the electronic devices become completely unnecessary or necessary at extremely low frequency. In the vehicle of 12 volts system, for example, if the magnetic field flux is increased by the permanent magnets so that the current flowing through the armature winding 2 for obtaining the torque required at the starting stage is restrained to 300 amperes or below, it is possible to simplify the cooling system for the converter 4, that is, an air cooling system can be used without problem. Besides, the converter 4 and its peripheral devices can be downsized, and the battery life can be prolonged due to reduction in charging or discharging current.

In order to prevent unnecessary fuel consumption and exhaust emissions during temporary stop of the car, so called, an idle stop mode has been adopted recently. In this driving mode, it is needed to instantly restart the internal combustion engine based on a starting instruction. According to the first preferred embodiment, as already explained, it is possible to reduce the number of turn of the field winding to make the time constant in the field winding 3 small. This means the above technique makes possible to shorten a rise time of the field current and to instantly restart the internal combustion engine.

On the other hand, if the field current is increased by the extent of the reduction of the number of turn in the winding, the torque is also increased by interaction with the additional magnetic flux by the permanent magnets 17, and the time for restarting can be further shortened.

Figure 3:
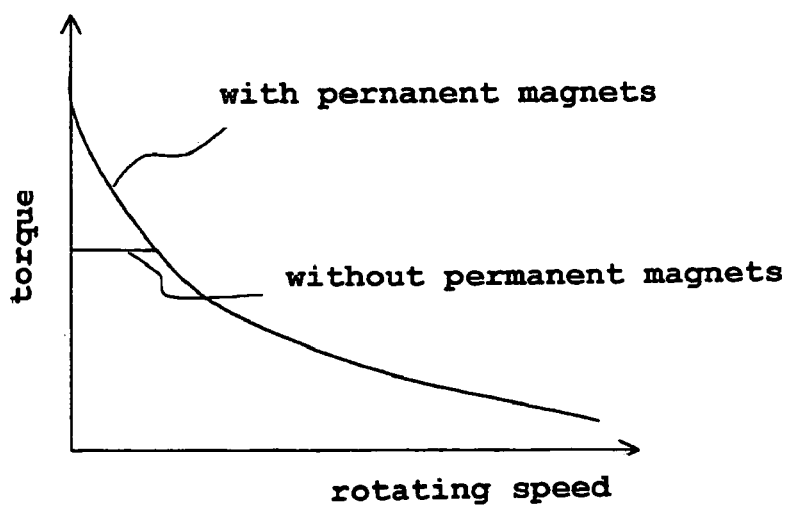
FIG. 3 to FIG. 6 are views showing a property of the vehicular generator-motor system according to the first preferred embodiment of this invention.
Figure 4:
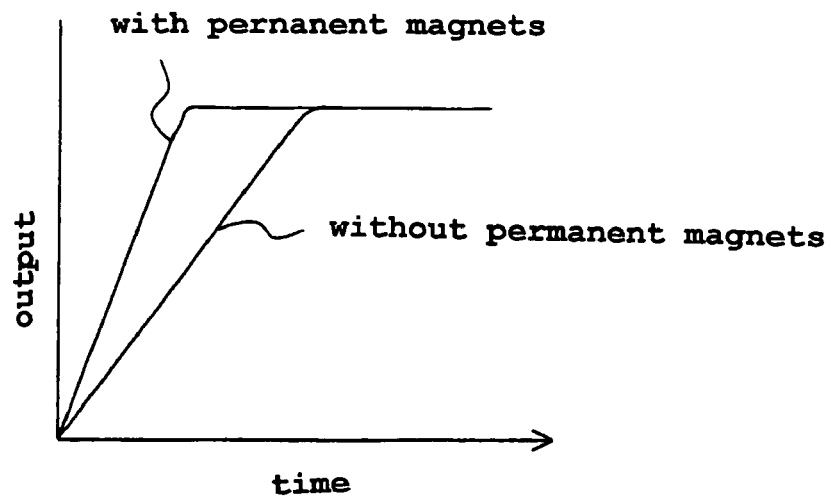

FIG. 3 and FIG. 4 show properties of the generator-motor 1 when it is operated as a motor. In FIG. 3, the torque produced by the generator-motor 1 is reduced as the rotating speed increases, as shown in the drawing.

In case where the armature current is restrained by PWM control to reduce each capacity of the switching elements 6u to 6w, 7u to 7w in the converter 4, the current flowing through the armature winding 2 can not be increased over a predetermined value at the time of low speed rotation, and the torque to be produced at the time of low speed rotation is accordingly limited. But, the additional magnetic field flux by the permanent magnet can compensate the torque, and the torque at the time of low speed rotation can be increased regardless of the armature current restraint.

FIG. 4 shows the comparison in the starting characteristics where both with the permanent magnets 17 and without the permanent magnets 17. Where there is the additional magnetic field flux by the permanent magnets, the output increases rapidly with increasing time after power on, because of capability of setting the time constant of the field winding 3 small. Thus, the starting time of the internal combustion engine can be shortened even if the converter 4 is limited in the capacity or the cooling system is simplified.

In case where the torque of the motor is increased due to the additional magnetic field flux by the permanent magnets 17, induced voltage increases as the rotating speed increases. Because, an electromotive force of the armature winding 2 is proportional to an amount of magnetic flux and a rotating speed. And if the induced voltage exceeds the output voltage of the converter 4, it becomes impossible to make a current control and to maintain the torque required at the time of high speed rotation. Consequently, the control means sets a targeted field current value in response to the rotating speed, and the field current control means 5 controls the field current in response to the targeted field current value, thereby maintaining the torque of the generator-motor 1 at the time of high speed rotation.

Figure 5:
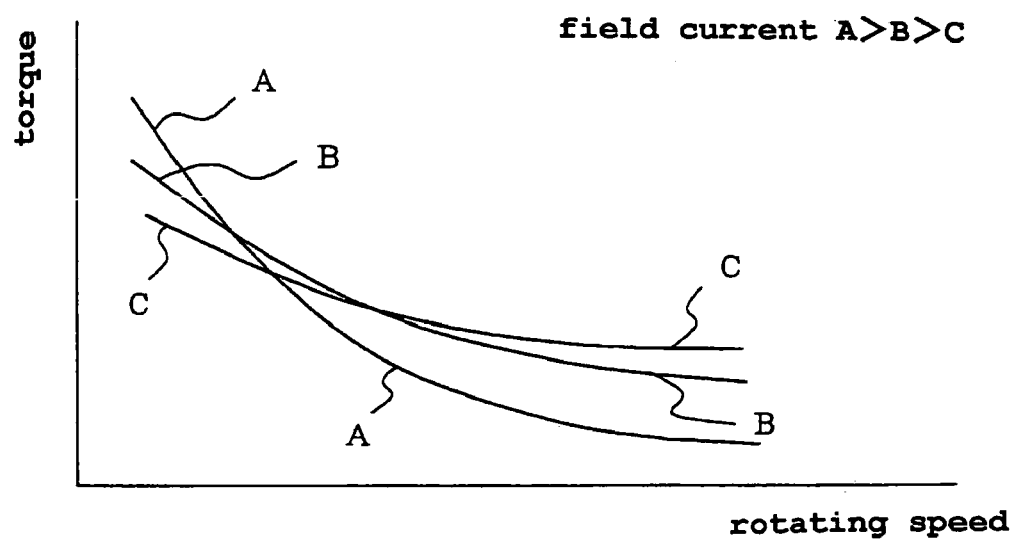

FIG. 5 is a graph showing the property of the generator-motor 1 when it is operated as a motor, wherein representing the output torque in ordinate and the rotating speed in abscissa when three parameters A, B, and C as the field current are given. If the field current control means 5 controls the field current in response to the rotating speed of the generator-motor 1 detected by the control means, it makes possible to obtain the torque performance in which the highest points among the respective parameter curves are continuously taken. It means that the internal combustion engine becomes possible to restart instantly and easily.

The system of the embodiment 1 is controlled so that the field current is increased at the time of low speed rotation so as to increase the effect for restraining the armature current by interaction with the additional magnetic flux by the permanent magnets 17, and is reduced with increasing rotating speed so as to be maintained to the targeted value corresponding to any rotating speed. As the result, the output torque of the motor can be set to the maximum torque or in the region thereof which corresponds to each rotating speed.

Figure 6:
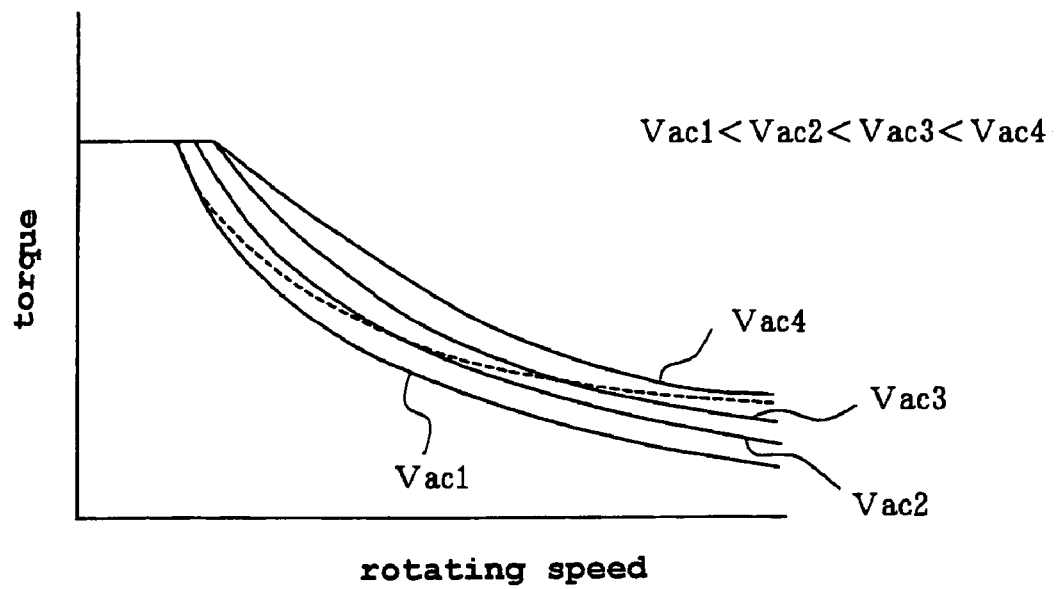

In case where the generator-motor 1 initiates the internal combustion engine, a relatively large current flows at the starting stage to reduce the terminal voltage of the battery 10. With increasing rotating speed, the armature current is reduced to greatly increase the terminal voltage of the battery 10 and thus the input voltage of the inverter is also increased with increasing rotating speed. The control means includes a control table in which three phase terminal voltage is set to control a current or a torque. However, the three phase terminal voltage controllable increases with increasing rotating speed. FIG. 6 is a graph showing the property of the generator-motor 1 wherein plotting the output torque in ordinate and the rotating speed in abscissa when four parameters Vac1, Vac2, Vac3, and Vac4 as three phase terminal voltage are given. The torque produced by the generator-motor 1 varies with three phase voltages as shown in solid lines. When the rotating speed of the generator-motor 1 is detected by the control means, the converter 4 is controlled as an inverter with three phase terminal voltage corresponding to the rotating speed. The produced torque relative to the rotating speed and three phase terminal voltage can be maintained at the maximum level as shown in dotted line and the motor output of the generator-motor 1 can be effectively increased as well.

Incidentally, by storing in the control table in the control means three phase terminal voltage value and the targeted field current value corresponding to the rotating speed, it make possible to more effectively control the generator-motor 1.

Embodiment 2

This embodiment relates to the control of the generator-motor 1 at a time when it is operated as a generator. When the generator-motor 1 is operated as a motor, as described above in detail, it is possible to reduce the number of turn of the field winding to make the time constant in the field winding 3 small, and to shorten a rise time of the field current. However, in this case, a generated property as a generator will be deteriorated, especially the output characteristics at the time of low speed rotation will be lowered, causing to a lack of charging frequently. With respect to this problem, it has been adopted conventionally that an AC current flowing through the armature winding is phase-controlled by the inverter so as to become negative to compensate the generated power. This control technique, however, deteriorates inevitably a generated efficiency because the phase-controlled current is supplied to armature winding 2.

Figure 7:
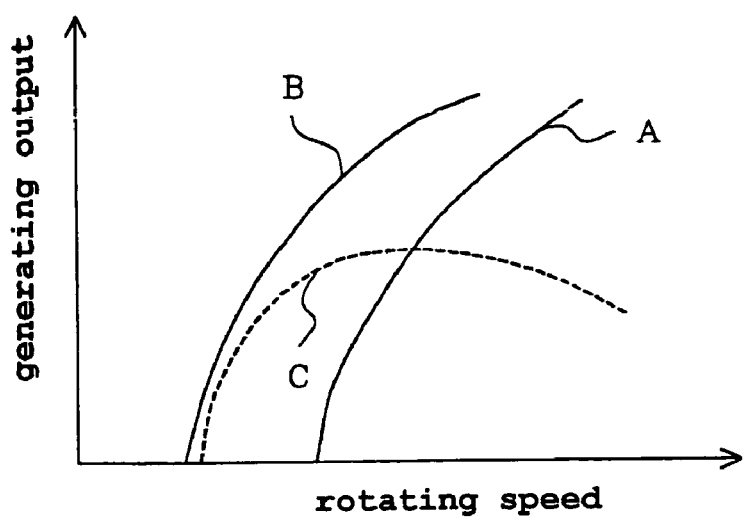
FIG. 7 is a view showing a property of the vehicular generator-motor system according to the second preferred embodiment of this invention.

According to the embodiment 2, it makes possible to improve the generated output characteristics without any compensation by the armature current because of compensating by the permanent magnets, instead. FIG. 7 is a view showing a property of the vehicular generator-motor system according to the embodiment 2. In FIG. 7, curve A shows the output characteristics where a time constant of the field winding is reduced, curve B shows where the effect of the permanent magnets is added to that of curve A, and curve C where the phase-controlled current is supplied to the armature. Those curves show clearly that the addition of the permanent magnets 17 makes possible to obtain sufficient generated output under the circumstance in which the number of turn of the field winding 3 is reduced and the generator-motor having both excellent generating property and motor property. In addition, it also makes possible to simplify the control of the converter 4 by means of limiting the converter 4 to inverter function only at the time of motor controlling.

Embodiment 3

Figure 8:
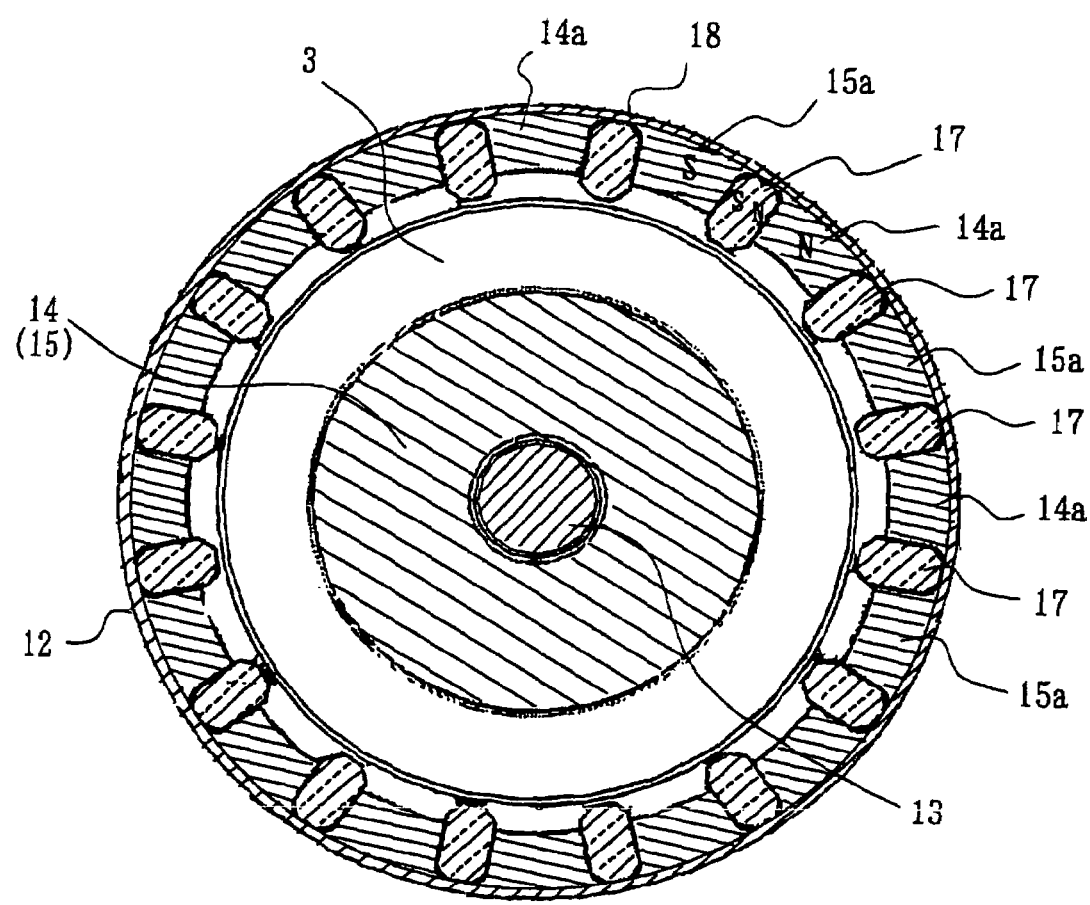
FIG. 8 is a partial sectional view of a rotor used for the vehicular generator-motor system according to the third preferred embodiment of this invention.

FIG. 8 is a partial sectional view of a rotor used for the vehicular generator-motor system according to the embodiment 3 of this invention. This embodiment intends to protect the permanent magnets inserted between the claw-shaped poles from the point of view of a mechanical strength and a demagnetization. In FIG. 8, the claw-shaped pole pieces 14a, 15a extended from the rotor core 14, 15 of the rotor 12 are alternatively arranged, and permanent magnets 17 are inserted between each of the different claw-shaped pole pieces 14a and 15a. Each permanent magnet is magnetized to the same polarity with that of the claw-shaped pole pieces to which it attaches. There is provided a bridge element 18 on the outer side of the claw-shaped pole pieces 14a, 15a and permanent magnets 17 to rigidly bind them. The bridge element 18 is made of a thin ring magnetic body and is secured on the peripheral portion of the claw-shaped pole pieces 14a, 15a, or is integrally formed with the claw-shaped pole pieces 14a, 15a by forging and the like. The permanent magnets 17 disposed between the claw-shaped pole pieces 14a, 15a undergoes a centrifugal force by rotating of the rotor 12 and also undergoes a demagnetizing field by a magnetomotive force from the field winding 3 and the armature winding 2.

In case where the permanent magnets are made of sinter magnet, it is not mechanically rigid material and it likely to lower a coercive force at the time of high temperature to produce the demagnetization due to the demagnetization. The above described configuration, however, makes it possible for the bridge elements 18 to undergo the centrifugal force exerted on the permanent magnets 17 and to shunt the demagnetizing field due to the field winding 3 and the armature winding 2, reducing a demagnetizing power. Therefore, the permanent magnets are protected mechanically as well as magnetically.

Whereas many alterations and modifications of the present invention will no doubt become apparent to a person of ordinary skill in the art after having read the foregoing description, it is to be understood that the particular embodiment shown and described by way of illustration is in no way intended to limit the scope of the claims which in themselves recite only those features regarded as essential to the invention.

What is claimed is:

1. A vehicular generator-motor system comprising:
    a rotary machine comprising:
        a stator having three phase armature winding and a rotor composed of a field winding for magnetizing a plurality of field magnetic poles, and
        permanent magnets for magnetizing said field magnetic poles by interaction with the field winding;
    an electrical power converter which performs as a rectifier when said rotary machine is operated as a generator, and performs as an inverter when said rotary machine is operated as a motor; and
    a control device controlling said electrical power converter, thereby, when said rotary machine is operated as the motor, said control device controls said electrical power converter so as to restrict the armature current at the time of low speed rotation,
    wherein the control device sets the armature current for starting torque to a smaller value to an extent of the field magnetic flux increased by the permanent magnets when said rotary machine is operated as the motor.

2. A vehicular generator-motor system according to claim 1, further comprising:
    a field current control device controlling a field current flowing through the field winding, wherein when said rotary machine is operated as a motor, said field current control device is controlled by said control device to increase said field current at the time of low speed rotation.

3. A vehicular generator-motor system according to claim 2, wherein said field current control device is controlled by said control device to reduce said field current with increasing rotating speed of said rotary machine.

4. A vehicular generator-motor system according to claim 1, wherein when said rotary machine is operated as a starting motor, said control device controls three phase terminal voltage of said inverter in response to the rotating speed of said rotary machine.

5. A vehicular generator-motor system according to claim 2, wherein when said rotary machine is operated as a starting motor, said control device controls three phase terminal voltage of said inverter in response to the rotating speed of said rotary machine.

6. A vehicular generator-motor system according to claim 3, wherein when said rotary machine is operated as a starting motor, said control device controls three phase terminal voltage of said inverter in response to the rotating speed of said rotary machine.

7. A vehicular generator-motor system according to claim 1, wherein the armature current at the time of low speed rotation is limited to 300 amperes or below.

8. A vehicular generator-motor system according to claim 1, wherein said electrical power converter operated as the inverter is air-cooled.

9. A vehicular generator-motor system according to claim 1, wherein said electrical power converter is functioned as the inverter only when said rotary machine is operated as a motor.

10. A vehicular generator-motor system according to claim 1, wherein said rotor includes a pair of claw-shaped poles in which each of pair poles has a plurality of claw-shaped pole pieces alternately meshed to each other, and each of said permanent magnets is inserted between said adjacent claw-shaped pole pieces.

11. A vehicular generator-motor system according to claim 10, wherein each of said adjacent claw-shaped pole pieces is magnetically shorted by a magnetic bridge element at the periphery of said claw-shaped poles, and said permanent magnets are disposed inside of said bridge elements.

* * * * *